United States Patent [19]
Fortune

[11] 3,990,623
[45] Nov. 9, 1976

[54] HOLDER SYSTEM FOR SOLDERING INSTRUMENT

[76] Inventor: William S. Fortune, 14250 Dearborn St., Panorama City, Calif. 91202

[22] Filed: May 5, 1975

[21] Appl. No.: 574,436

Related U.S. Application Data

[60] Continuation-in-part of Ser. No. 562,877, March 28, 1975, which is a division of Ser. No. 121,808, March 8, 1971, Pat. No. 3,883,716.

[52] U.S. Cl. ................................. 228/57; 248/176; 219/242
[51] Int. Cl.² .................... B23K 3/00; F16M 11/00; H05B 1/00
[58] Field of Search ................ 228/57; 248/44, 176; 219/242; 15/268, 114, 104.92, 160

[56] References Cited
UNITED STATES PATENTS

| | | | |
|---|---|---|---|
| 1,998,081 | 4/1935 | Gerlich | 138/94.5 |
| 2,326,572 | 8/1943 | Shangle | 219/242 |
| 2,570,041 | 10/1951 | Wedmore | 219/242 X |
| 3,188,674 | 6/1965 | Hobbs | 15/160 X |
| 3,609,791 | 10/1971 | Siegel et al. | 15/114 |
| 3,765,047 | 10/1973 | Tashjian | 248/176 X |

FOREIGN PATENTS OR APPLICATIONS

| | | | |
|---|---|---|---|
| 699,027 | 11/1940 | Germany | 15/160 |

*Primary Examiner*—Al Lawrence Smith
*Assistant Examiner*—Margaret Joyce
*Attorney, Agent, or Firm*—Daniel T. Anderson

[57] ABSTRACT

A soldering iron holder system for a soldering station is disclosed which includes a protective, insulated chamber into which the working shaft and heated tip of the soldering tool may be inserted. A self locking cradle supports the tool from its handle portion and prevents its undesired removal from the holder system. For additional security, the system includes hold-down for fastening the entire system to the bench top. The holder also includes means for dispensing wire solder on demand. A built in reservoir and pump are also provided to supply cleansing fluid as for cleaning the soldering tip. To assist in the latter, a sponge is affixed to the body of the holder and is wetted from the reservoir by operation of the pump.

9 Claims, 30 Drawing Figures

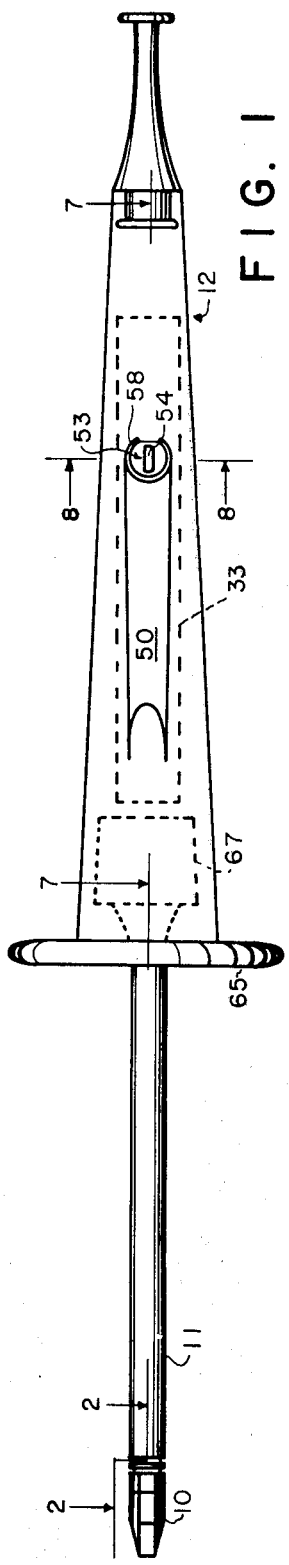
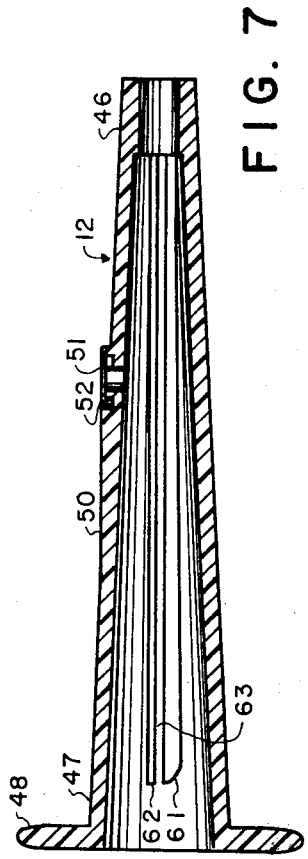

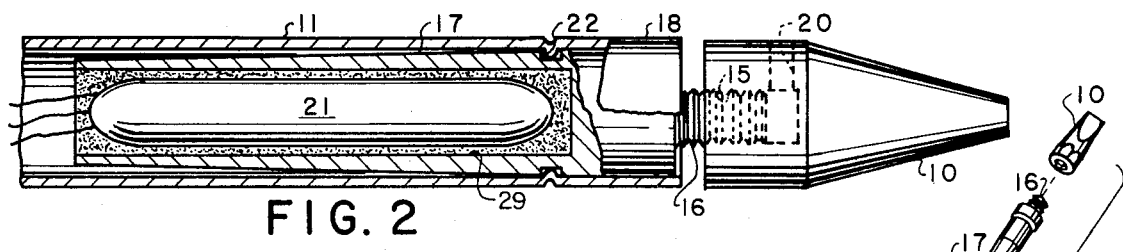
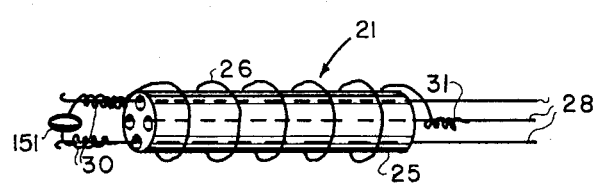
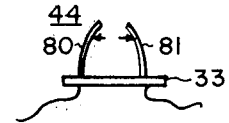
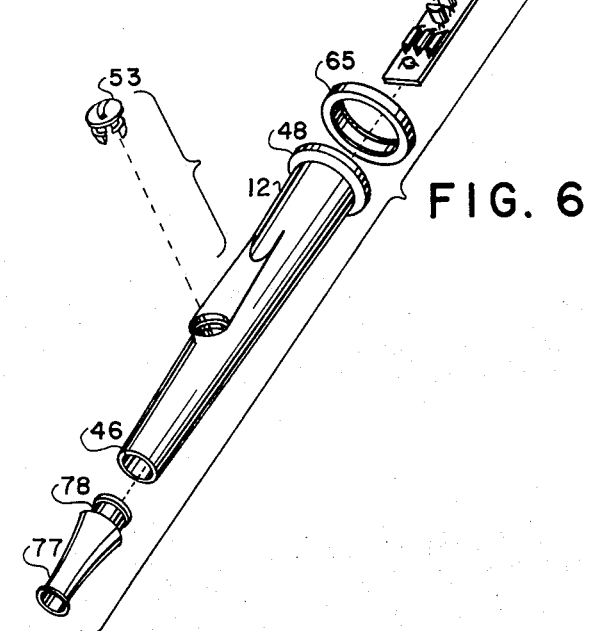

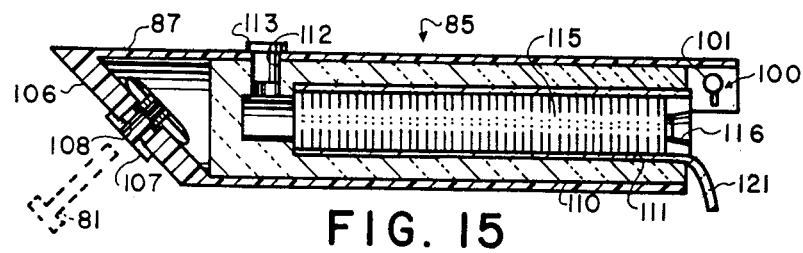
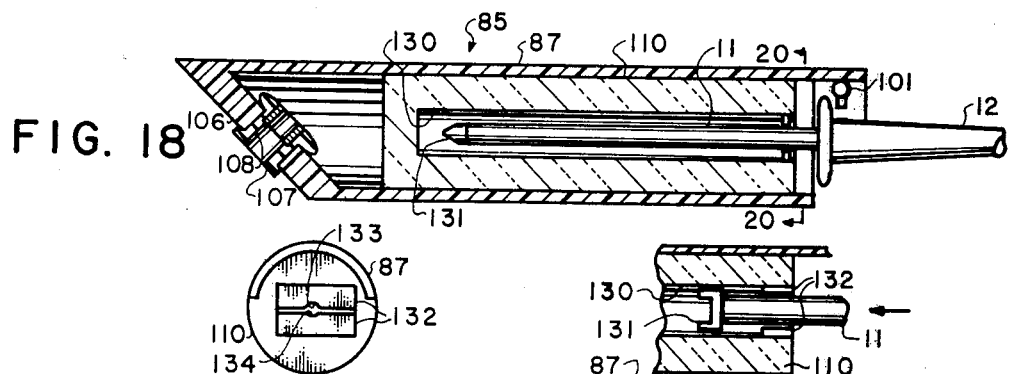
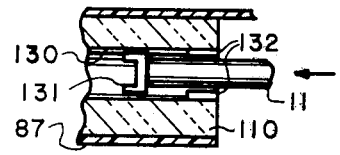
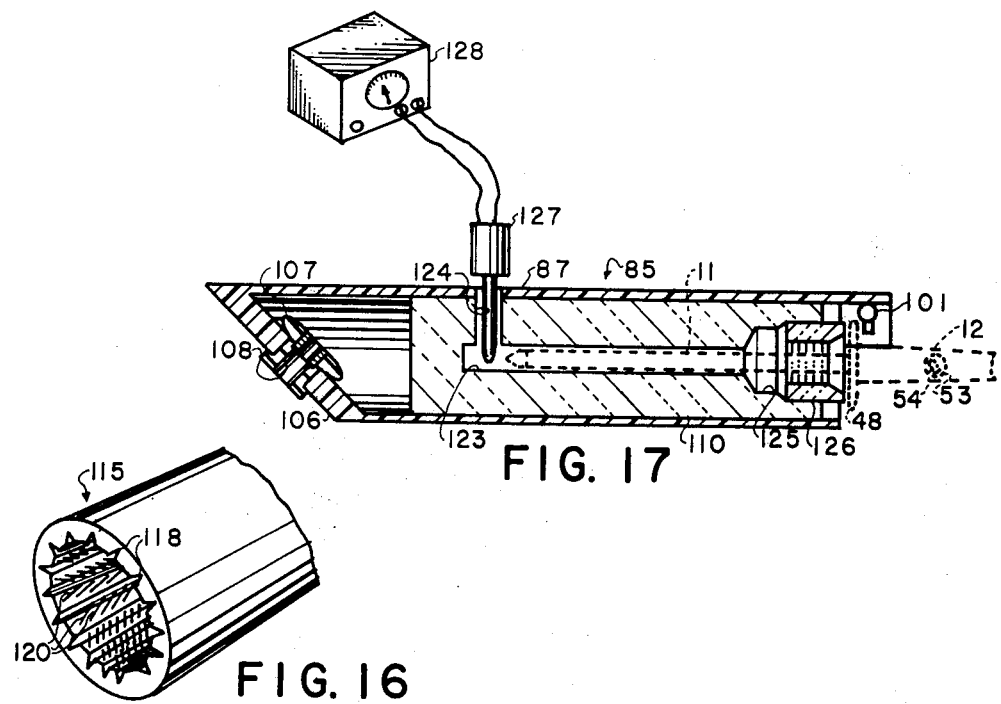

HOLDER SYSTEM FOR SOLDERING INSTRUMENT

REFERENCE TO OTHER APPLICATIONS

This application is a continuation-in-part of copending application Ser. No. 562,877 filed Mar. 28, 1975, entitled TEMPERATURE CONTROLLED SOLDERING INSTRUMENT AND HOLDER SYSTEM, which is a divisional application of copending application Ser. No. 121,808 filed Mar. 8, 1971, issued as U.S. Pat. No. 3,883,716 on May 13, 1975, entitled TEMPERATURE CONTROLLED SOLDERING INSTRUMENT.

BACKGROUND OF INVENTION

1. Field of the Invention

The invention relates generally to electric soldering and more specifically to a soldering station holder system for protectively and conveniently holding a soldering instrument.

2. The Prior Art

The soldering iron may, for example, be used for soldering large terminals or for wiring of small printed circuit boards. For many purposes it is desirable to have available a soldering iron which is always ready for instant use, that is, a soldering iron which is always kept at the proper operating temperature. This, of course, requires a temperature control means of some type.

It has accordingly been suggested in the past to provide a soldering iron having a temperature sensing element located at or near the soldering tip of the iron. Various control circuits have been suggested in the part for this purpose including the use of magnetic amplifiers and the like. Alternatively, relays have been suggested for turning the power supply on and off.

However, in the past, it has not been possible to provide both a simple electronic control circuit and an efficient temperature sensor which provides a large change of resistance with a small change of temperature so as to permit construction of a precision instrument.

Furthermore, it has not been possible in the past to combine an instrument of this type with a control circuit located entirely in the handle of the instrument thereby to provide a lightweight and compact soldering instrument.

It is accordingly an object of the present invention to provide a compact, efficient and lightweight soldering and desoldering instrument system with an electronic control circuit located in the handle of the instrument thereby to maintain the temperature of the soldering tip at the desired temperature for an extended period of time.

Another object of the present invention is to provide a special closed tool holder for the soldering instrument thereby to prolong the life of the soldering tip and the lifetime of the heating element so that the instrument may be maintained at operating temperatures for prolonged periods of time without adversely affecting the life of the instrument.

A further object of the present invention is to provide a soldering instrument of the type disclosed which includes a closed loop temperature control and includes means for setting the temperature of the soldering tip from the outside of the handle of the instrument without the necessity to disconnect or disassemble the instrument.

Still another object of the present invention is to provide an electronically controlled soldering instrument with a special fuse which will disconnect the power supply either upon the occurrence of an electrical overload or whenever the temperature exceeds a predetermined value.

Another object is to provide a soldering tool holder which protects the soldering instrument from causing burn damage and from being damaged or stolen.

It is another object to provide such a holder system which includes solder wire dispensing capability and means for containing and utilizing cleansing fluid for cleaning the soldering instrument tip.

SUMMARY OF INVENTION

Briefly these and other objects are achieved in accordance with the structural aspects of an example of the invention in which the soldering and desoldering instrument system includes a temperature sensor located adjacent to the soldering tip of the instrument and capable of providing a relatively large change of resistance with a small change of temperature. By way of example the temperature sensor may consist of a thermistor providing a resistance change of 1.6% for each change of temperature of 1° Fahrenheit (F). The thermistor may form part of a resistance bridge, the unbalance of which may be sensed by a differential amplifier. The differential amplifier in turn provides an error signal which turns on or off the current supply to the heater element of the instrument. Preferably the resistance bridge and differential amplifier are arranged to operate on only one half cycle of the alternating input current so that the current carrying capacity of the components of the control circuit is minimized.

Further features of the invention may include the particular construction of the handle of the soldering instrument including an adjustment button cooperating with a potentiometer which permits setting of the temperature of the soldering tip. Additional features include the assembly of the handle of the instrument including a printed circuit board for the control circuit as well as a locking bushing for holding the soldering tip and the heater element sleeve providing a secure engagement between the handle and the heater element sleeve.

Still further features of the present invention include a soldering instrument tool holder for thermally insulating and physically protecting the soldering instrument, for cleaning the soldering instrument, for dispensing wire solder and cleansing fluid such as water.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF DRAWINGS

FIG. 1 is a plan view of an example of a soldering and desoldering instrument of the invention;

FIG. 2 is an elevational view, partly in section, and on enlarged scale taken on line 2—2 of FIG. 1 illustrating the construction of an example of the soldering tip and its heating element;

FIG. 3 is a perspective view of an example of the heating element for the soldering tip with the temperature sensor;

FIG. 6 is an exploded view of the soldering instrument of FIG. 1 illustrating its component parts;

FIG. 7 is a longitudinal sectional view, taken on line 7—7 of FIG. 1 illustrating the housing or handle of the instrument;

FIG. 10 is a fragmentary side elevational view of the closed fuse of the control circuit responsive to either excess of current or temperature;

FIG. 11 is a fragmentary side elevational view similar to that of FIG. 10 and illustrating the fuse in the open position;

FIG. 15 is a sectional view of the soldering instrument tool holder of FIG. 12 including an internal brush liner for wiping off or cleaning solder and other particles from the soldering instrument;

FIG. 16 is a view in perspective of a portion of the brush liner disposed in the tool holder of FIG. 15;

FIG. 17 is a sectional view of another embodiment of the soldering instrument tool holder including a meter for measuring the temperature of the tip of the soldering instrument;

FIG. 18 is a sectional view of still another embodiment of the soldering instrument tool holder of the invention and particularly designed for a soldering instrument having a soldering tip with rectangular cross-section;

FIG. 19 is a fragmentary sectional view, similar to that of FIG. 18 showing a pair of swinging doors provided at the entrance of the tool holder in the open position while the soldering tip is being inserted;

FIG. 20 is an end elevational view taken on line 20—20 of FIG. 18 illustrating the swinging doors at the entrance of the tool holder in the closed position;

DESCRIPTION OF PREFERRED EMBODIMENT

SOLDERING INSTRUMENT

Figure 4:
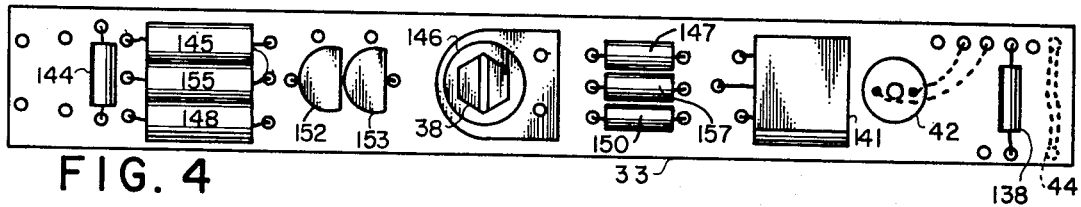
FIG. 4 is a top plan view, on enlarged scale, of an example of the printed circuit board, with its electric components, disposed in the handle of the instrument.

Referring now to the drawings, and particularly to FIGS. 1 through 9, there is shown by way of example a soldering and desoldering instrument embodying the present invention. In the following specification and claims the term "soldering instrument" is meant to include both a soldering as well as a desoldering device. As shown for example in FIG. 1, the soldering instrument includes a soldering tip 10, a heater element sleeve 11 and a handle or housing 12 for a circuit board 33 which supports the active and passive elements of the electronic control circuit of the instrument.

As shown particularly in FIG. 2, the soldering tip 10 may be provided with an internal thread 15 into which may be threaded a threaded bolt 16 forming part of the heater element cartridge 17. Thus the cartridge 17 may be provided with a head portion 18 from which protrudes the threaded bolt 16. The soldering tip 10 may also be provided with an aperture or bore 20 for inserting there a temperature measuring instrument such as a thermocouple. Such a thermocouple may be pressed by the bolt 16 against the soldering tip 10 by screwing the tip 10 forcibly against the cylindrical portion 18 of the cartridge so that thermal contact is achieved between the measuring instrument and the soldering tip.

The heating element or heating cartridge sleeve 11 may consist of a suitable metal such for example as stainless steel. The heating element cartridge 17 may be rearwardly tapered as shown in FIG. 2. This design permits an air space of increasing size between the heating cartridge 21 and the outer sleeve 11. This in turn minimizes heat flow from the heating cartridge 21 to the handle 12. The heater element cartridge 17 may consist of a heat-conductive material such as copper. It should be noted that the heater element cartridge 17 is provided with an annular shoulder 22 into which the outer sleeve 11 may be swaged to provide a firm contact and secure mounting.

Preferably the threads of the bolt 16 are coated with a suitable high temperature anti-seize compound. Such an anti-seize compound may be baked on the outer threads. Also the soldering tip 10 may be electroless nickel plated. It should also be noted that since the soldering tip 10 may be screwed on, or unscrewed, it is feasible to attach various soldering tips depending on the particular purpose. For example, the soldering tip may be provided with a chisel point, it may be formed like a spade or it may be provided with one or more longitudinal capillary slots for removing liquid solder from a joint that may have to be unsoldered.

The construction of the heating cartridge 21 is shown particularly in FIG. 3 to which reference is now made. It includes a ceramic core 25 about which is coiled a suitable resistance wire 26 which when supplied with current will produce a desired amount of heat. A temperature sensing element 151 is mounted at the far end of the resistance wire 26 and is disposed in close proximity to the soldering tip 10. Thus it is preferably disposed near or in the cylindrical portion 18 of the heater element sleeve 11.

It should be noted that 3 leads 28 feed the resistance wire 26 and the temperature sensing element 151 so that two wires form the current path for the resistance wire 26 while the remaining third wire carries the error signal from the temperature sensing element 151. The leads 28 may be coiled to provide spring like portions shown at 30 and 31 to permit expansion and contraction of the metallic elements upon heating and cooling of the heater cartridge. A high temperature ceramic adhesive 29 may secure the heater cartridge 21 to the heater element cartridge 17.

Figure 5:
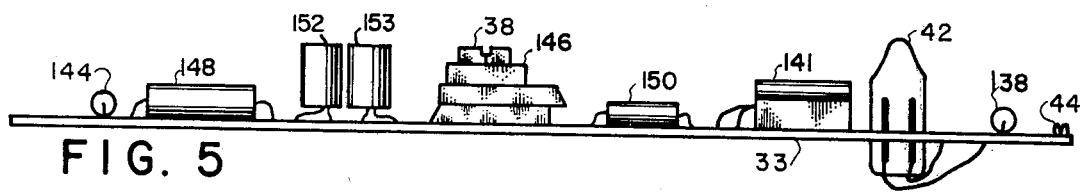
FIG. 5 is a side elevational view of the printed circuit board and components of FIG. 4.

The electric control circuit 12, in this example, mounted on the control board or printed circuit board 33 shown particularly in FIGS. 4 and 5 to which reference is now made. Mounted on the circuit board 33 is a diode 144 followed by a set of three resistors 145, 155, 148, and two transistors 152, 153. A potentiometer 146 is provided with an adjustment ridge 38 as shown. This is followed by another set of three resistors 147, 157, 150, and a silicon-controlled rectifier 141. A neon indicator lamp 42 may be provided to show that current is supplied through the heater element and this is followed by another resistor 138 and a fuse 44, the construction and operation of which will be discussed hereinafter in connection with FIGS. 10 and 11. The operation of the control circuit, the physical construction of which is shown in FIGS. 4 and 5, will be explained hereinafter in connection with FIG. 21.

Reference is now made to FIGS. 6 and 7 illustrating particularly an example of the handle 12. As shown in FIG. 7, the handle 12 is of generally truncated conical or tapered shape having a reduced end portion 46 and a large end portion 47 with a generally disk shaped end 48. As shown particularly in FIGS. 1 and 7, the handle 12 has a somewhat flat top portion 50 provided with an aperture 51 having an enlarged annular outer portion 52. The opening 51 is designed to receive a control button generally designated at 53 in FIG. 6. As shown particularly in FIG. 1 and 8, the control button 53 is provided with an outer slot 54 by means of which it may be rotated, for example, by inserting a coin into the slot.

The control button 53 is designed to cooperate with the potentiometer 146 on the circuit board 33 and its control ridge 38. To this end the control button 53 may be provided with two downwardly extending ears 55 separated by a recess or relief 56. Thus the two ears 55 are capable of yielding to a radially inwardly directed pressure and may be inserted into the opening 51 in the handle 12 even though they have a larger diameter. The control button 53 is then locked into the handle 12 but is capable of rotation through a predetermined angle. Rotation of the control button 53 is limited by the provision of a stop tab 57 on the control button which cooperates with a segment-shaped projection 58 in the handle 12 s shown for example in FIG. 1. The control button 53 has a disc-like enlarged upper portion 60 which is received by the enlarged annular aperture 52 in the handle so that up and down movement of the control button 53 is limited in both directions by its upper disc 60 and by the enlarged ears 55.

The ears 55 now engage the control ridge 38 of the potentiometer 146. Accordingly it will be seen that rotation of the control button 53 by inserting a coin or the like into its upper slot 54 will cause rotation of the potentiometer. This in turn will cause a setting of the temperature of the soldering tip 10 to a particular desired value depending on the purpose to which the soldering instrument is to be put.

Referring again to FIGS. 7 and 8, it will be seen that the handle 12 is provided with two internal adjacent longitudinal projections 61 and 62 between which is formed a guidance slot 63 into which the circuit board 33 may be inserted. Due to the tapered construction of the handle 12 the circuit board which may be inserted from the left of FIG. 7 can only be pushed so far until its potentiometer 37 is disposed exactly is alignment with the opening 51 in the handle 12.

Figure 9:
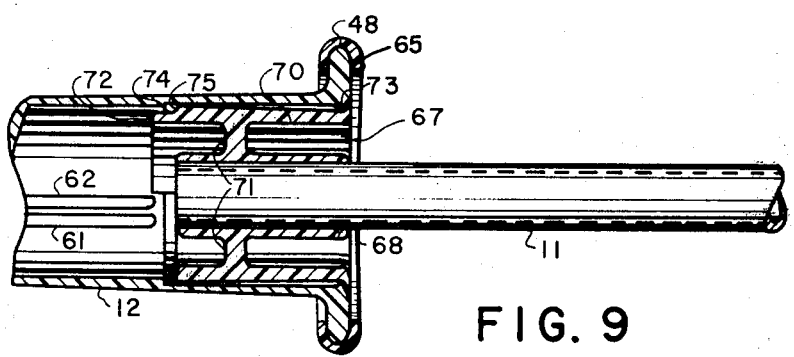
FIG. 9 is a cross-sectional view similar to that of FIG. 7 illustrating the handle housing with the locking bushing for the heating element in locked position as well as the guides for the printed board.
Figure 8:
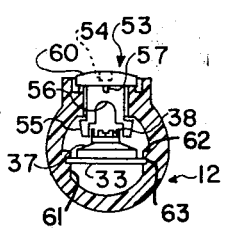
FIG. 8 is a cross-sectional view taken on line 8—8 of FIG. 1 illustrating the temperature setting button in cooperation with the potentiometer of the control circuit.

As shown particularly in FIGS. 1, 6, and 9, there may be provided a flexible or yieldable element 65 which is arranged to be forced over the disc like end 48 of the handle 12. This operates like a soft elastic bumper ring to prevent mechanical shock damage to the handle 12 and its electronic components.

Also shown in FIG. 6, there is provided a locking bushing 67 shown in more detail in FIG. 9 to which reference is now made. The locking bushing 67 is provided with an internal cylindrical recess 68 into which may be inserted the heating element sleeve 11. An outer cylindrical portion 70 of the locking bushing 67 may be connected to the inner cylindrical portion 68 by a radially extending web 71. The outer cylindrical portion 70 has a rearwardly extending portion 72 which extends essentially over an angle of 180° thereby to prevent rotation of the locking bushing by engagement with one of the circuit board guiding projections such as 62 from the inner surface of the handle 12. This, as clearly shown in FIG. 9, prevents further rotation of the locking bushing 67.

The bushing 67 is also locked in a longitudinal direction by the provision of an inwardly extending lip 73 formed at the outer end of the handle 12 adjacent the disc like portion 48. This will accordingly lock the locking bushing 67 and prevent it from moving toward the right in the drawing. Movement in the opposite direction is prevented by a bushing stop 74 provided in the inner surface of the handle 12 and engaging a matching shoulder 75 in the rearward portion 72 of the locking bushing 67.

As further shown in FIG. 6, there may be provided an element 77 of a suitable flexible or yieldable material through which the electric cord may extend which supplies power to the instrument. The element 77 may be of generally conical shape having an external recessed portion 78 for insertion into the small rear portion 46 of the handle 12.

Preferably the handle 12, the control button 53 and the locking bushing 67 are molded of some suitable plastic and insulating material. Preferably such a plastic insulating material is transparent for general appeal and inspection purposes and may, for example, consist of a polycarbonate sold in the trade by General Electric Company under the name Lexan. Furthermore, the protective ring 65 and the cord holder 77 may be also molded from a suitable insulating and plastic material. These parts need not be transparent.

Turning now to FIGS. 10 and 11, there is shown the fuse generally indicated at 44 in FIGS. 4 and 5. Thus as shown in FIG. 10, a pair of wires 80 and 81 extend through the circuit board 33. As shown in FIG. 10, they are interconnected by a lump 82 of a low melting point alloy. The fuse 44 is provided for the purpose to open so as to interrupt the line power to the active circuit elements either if the current flow is beyond a predetermined value or if the ambient heat exceeds a predetermined point. Thus the two wires 80 and 81, or if desired a plurality of such wires, are held together by the low melting temperature alloy 44.

By way of example, two wires having a diameter of 5 mils (0.005 inches) may be soldered together with an alloy metal which is designed to melt at a temperature of 158° F. Thus when the temperature exceeds 158° F. the alloy will melt and the wire will spring open as shown in FIG. 11. Such a 5 mil diameter will handle a current flow on the order of 0.5 amperes without causing significant heating. However, if the current flow should be increased to approximately 7/8 amperes the wire will immediately become hot thus melting again the low temperature soldering alloy. The wires 80, 81 preferably consist of a suitable spring wire consisting, for example, of a nickel-chrome or a beryllium-copper alloy.

By increasing, for example, the size of the spring wire from 5 mils to say 12 mils, the normal current consumption could be increased to say 1.5 amperes. If it should be desired to have the fuse melt at a higher temperature such as 190° F, it is feasible to use a soldering alloy which melts at such a temperature. Thus by properly selecting the size of the wire and the melting temperature of the alloy or solder, a fuse may be arranged to give protection at any desired current or any desired temperature.

It will be appreciated that the use of the fume 44 greatly increases the safety of the resulting instrument in that the instrument will be automatically disconnected from the current supply either if the input current increases beyond a desired value or if the temperature increases due to any malfunction of any element.

Having now described the construction and general operation of the soldering instrument of the invention, the construction of a tool holder for such a soldering instrument will now be discussed. Subsequently, the electric temperature control circuit which controls the instrument will be described.

TOOL HOLDER FOR SOLDERING INSTRUMENT

Various embodiments of a tool holder in accordance with the present invention for the previously described soldering instrument will now be discussed. These are illustrated in FIGS. 12 through 21 to which reference is now made.

Figure 12:
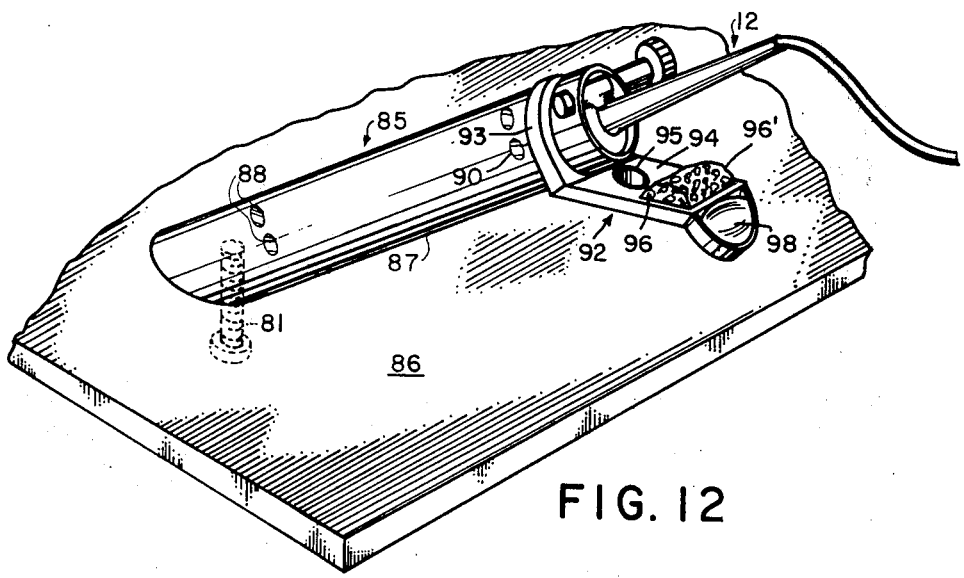
FIG. 12 is a view in perspective of one embodiment of the soldering instrument tool holder with a soldering instrument inserted therein and with a soldering tip wiper, a lens and solder flux pot.

Referring now particularly to FIG. 12, there is shown a tool holder generally indicated at 85 which may be secured, for example, to a work table 86 for holding the soldering instrument of the invention. Thus there is shown protruding from the tool holder 85 the handle 12 of a soldering instrument. The tool holder 85 itself consists of a generally cylindrical hollow housing 87 into which the soldering instrument may be inserted.

The housing 87 may consist of a heat resistant material such as a suitable plastic material which may be molded. It may be provided with a set of cold air inlet opening 88 near the bottom of the instrument and another set of hot air outlet openings 90 disposed near the entrance of the holder. Alternatively the air openings may be longitudinal adjacent a set of outwardly extending ridges 89 which serve the purpose to afford a relatively cool gripping surface. The holder 85 may be secured to the work bench or table 86 by a suitable threaded bolt 91 which in turn may be secured to the housing 87 in a manner to be further explained in connection with FIG. 15.

The tool holder 85 may be provided with an attachment 92 including a ring-shaped holder 93 which is adapted to surround the housing 87. Preferably, the housing 87 has a slightly conical portion near its entrance to afford a press fit to the ring 93. The attachment then continues in a generally horizontal tray 94 including a pocket-like depression or opening 95 adapted to contain a flux. Another pocket 96 may be provided for holding a sponge 96' which may consist of a suitable heat resistant plastic. The spone may serve the purpose to clean the soldering tip after use. The tray 94 may finally be provided with a magnifying lens 98 which may be molded together with the remainder of the attachment 92. The lens may serve the purpose of inspecting the finished work or facilitating soldering of small parts.

Figure 13:
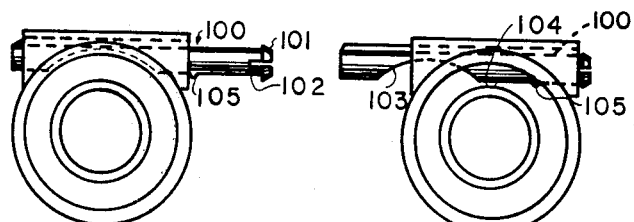
FIG. 13 is an end elevational view of the soldering instrument tool holder of FIG. 12 and its locking pin in the open position.
Figure 14:
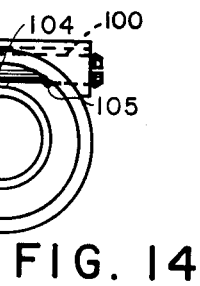
FIG. 14 is an end elevational view similar to that of FIG. 13, with the locking pin shown in the locked position.

Preferably, the holder 85 is provided with a suitable locking mechanism for the soldering instrument and shown particularly in FIGS. 13 and 14. This may, for example, consist of a locking pin 100 having an actuating button 101 at one end thereof which may be mounted therein by a suitable pin 102. The locking pin 100 is provided with a curved recess 103 which permits the soldering tool to enter the holder when in the position of FIG. 13. Subsequently, it may be moved into the position of FIG. 14 whereby the flat or straight portion 104 of the locking pin 100 locks the soldering instrument in the holder. Thus the locking pin may engage the bumper ring 65 on the soldering instrument as shown in FIG. 1.

The locking pin 100 may be provided with a semispherical projection or button 105 extending on the under surface of the pin 100. it serves the purpose of locking the pin in either the position of FIG. 13 or that of FIG. 14. As shown in FIG. 13, it prevents accidental closing or locking because it has to be forced into a narrow circular opening within the tool holder housing 87. Similarly when it has been pushed into the locked position the projection 105 prevents accidental opening of the locking pin.

By locking the soldering instrument by moving the locking pin into the position of FIG. 14, accidental removal of the soldering instrument from the holder, for example by accidentally pulling on the cord, is prevented.

Another embodiment of the tool holder of the invention is illustrated in FIGS. 15 and 16 to which reference is now made. Here the tool holder 85 may be the same as that previously shown and may include the locking pin 100 with its operating knob 101. The rear portion 106 of the housing 87 may form an arcuate angle as shown. It may be provided with a mounting bushing 107 having an internal thread 108 for engagement with the mounting bolt 81 which permits to secure the holder to a suitable surface.

The tool housing 87 may be provided with a heat insulating cylindrical inert 110. This may, for example, consist of a heat insulating rigid foam. It will be understood that the air openings 88, 90 (see FIG. 12) only extend through the housing 87. The insert 110 forms an internal cylindrical chamber 111 and may be provided with a radial opening 112 which communicates with the exterior. This opening may be closed with a suitable hole plug 113 when not in use. However, it may be used for inserting therein the sensor of a temperature measuring device so that the soldering instrument may be calibrated in a manner to be presently explained in connection with FIG. 17.

The cylindrical opening 111 of the heat insulating liner 110 may be filled with a brush liner 115. This brush liner may serve the purpose to clean the soldering tip of the instrument from accumulated solder or other particles. For the same purpose, a bushing 116 may be provided at the entrance of the opening 111 partly to clean the soldering tip and partly to heat insulate it from the outside air.

The brush liner 115 may be made from a flat structure of a suitable heat insulating material having depression or corrugations therein. This is shown particularly in FIG. 16 which illustrates the formed brush liter 115 having corrugations 118 therein and individual brushes or filaments 120 extending from the flat portions between the depressions 118. The brush liner 115 may be provided with a pull tab 121 so that it may be removed and cleaned or replaced as necessary.

The instrument holder of FIG. 17 may be generally the same of that of FIG. 15. However, it is specifically designed for calibrating the temperature of the soldering instrument. The housing 87 of the tool holder may be of the same shape as that of FIG. 15 and may be provided again with a heat resistant liner 110 which may consist of a rigid foam. This may provide an internal cylindrical opening 123 for inserting therein the soldering tip and heater element sleeve 11. The liner 110 may also be provided with another radially extending opening 124 communicating with the outside and extending through the housing 87. An enlarged opening 125 may commumicate with the opening 123 and may form a particle trap, that is, a trap for the particles which may adhere to the soldering tip. A removable brush liner 126 may be disposed adjacent to the opening 125 and near the entrance of the instrument. The brush liner 126 may be made removable so that it may be cleaned or replaced as the need arises.

A temperature sensing probe 127 may be inserted into the radial opening 124 and may be connected to a temperature indicator 128.

Accordingly, a soldering instrument may be inserted into the tool holder 85 as shown in FIG. 17. The slot 54 of the control knob 52 which extends outside of the tool holder may now be turned until the temperature indicator 128 indicates the desired temperature of the soldering tip. Thus the tool holder 85 may be used for calibrating or setting a number of soldering instruments to any desired temperature depending on the purpose for which each instrument is to be used. It will be noted that this temperature setting may be effected without moving the soldering iron because the control knob 53 extends from the tool holder 85 and may be set without removing the instrument. When the setting or calibration of the instruments is finished the temperature probe 127 may be removed from the radial opening 124 which may then be closed with a suitable plug such as plug 113 of FIG. 15.

By retaining the soldering instrument in the tool holder, heat loss, or current consumption, is minimized as well as oxidation of the soldering tip because there is little or no air flow around the soldering tip. This in turn will extend the life of the soldering tip and the heating element as well as minimizing current consumption.

Still another embodiment of the tool holder of the invention is illustrated in FIGS. 18 through 20 to which reference is now made.

Again, the housing 87 of the tool holder 85 may have the same shape as shown in FIG. 15. A heat resistant liner 110 which may consist of a rigid foam forms an internal chamber or opening 130. The liner 110 may be closed at its far end as shown. The main purpose of the tool holder 85 of FIG. 18 is to accommodate a soldering tip 131 of generally rectangular or U-shape. Such soldering tips may be particularly useful for desoldering soldered joints.

To this end the entrance to the liner 110 may be provided with a pair of swinging doors 132 which may be spring biased or flexible to permit the entrance of the soldering tip 131 as shown in FIG. 19. After the instrument has been moved into the opening 130, the swinging doors 132 are shut again as shown in FIG. 20. Each of the swinging doos 132 may be provided with a central semi-circular recess 133 and 134 for permitting the outer sleeve 11 of the heating element of the soldering iron to pass through. Accordingly, after the swinging doors 132 have been closed, the instrument is substantially heat insulated within the heat resistant linear 110.

Figure 22:
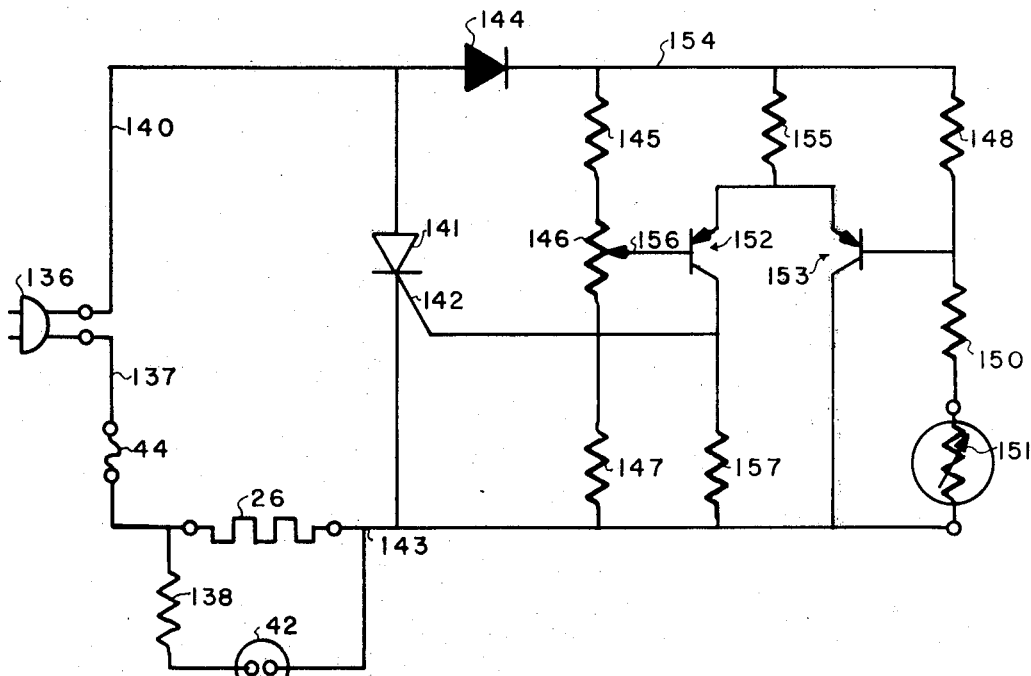
FIG. 22 is a fragmentary longitudinal sectional view of an example of an insulative, molded thermal "blanket" portion of the tool holder.
Figure 23:
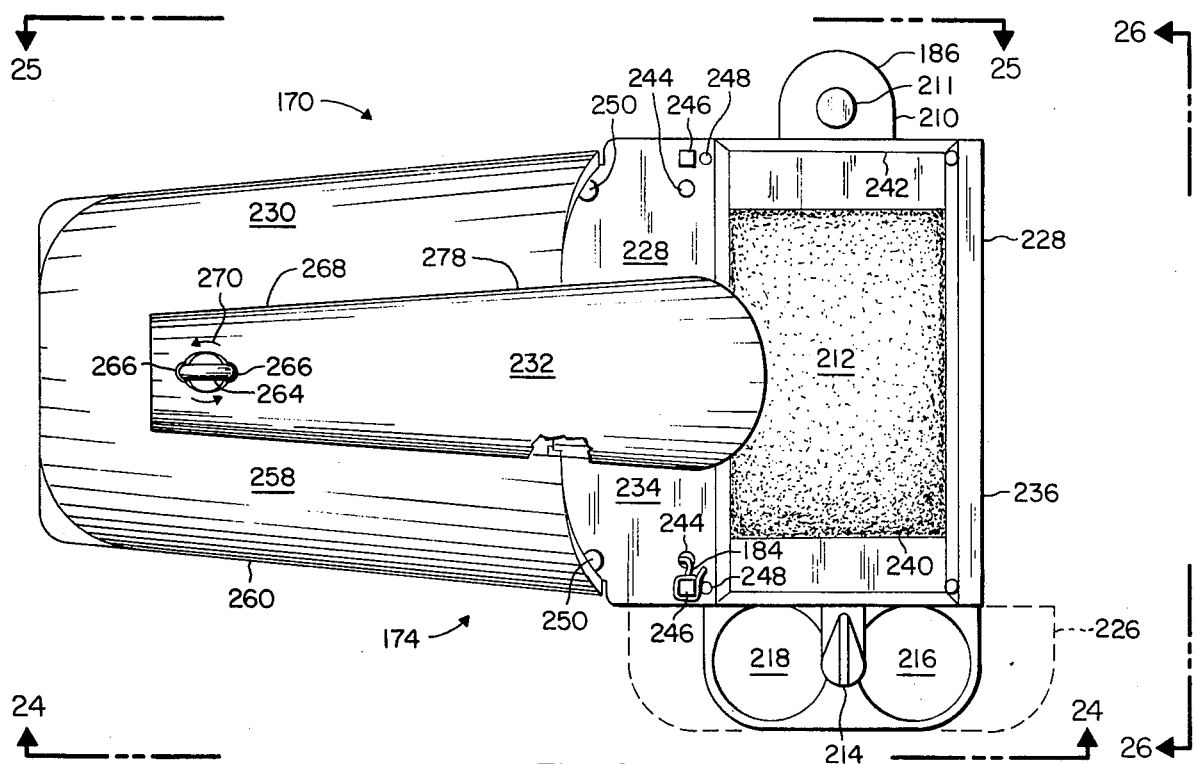
FIG. 23 is a plan view of a further example of a soldering instrument holder system constructed in accordance with the principles of the invention.

Among the advantages of the tool holder 85 of the invention is the fact that it prolongs the life of the soldering instrument while reducing the current consumption. Furthermore, it permits maintaining the solering instrument at all times at its proper operating temperature so that it is always ready for use. Accidental removal of the soldering instrument by accidentally pulling, for example, on its cord, is substantially prevented by the locking mechanism. Further, the holder of the invention makes it possible to place the soldering instrument in its holder in a tool box or the like without damaging the tool box due to the heat of the instrument. Also, the raised ridges 89 on the outside of the housing 87 permit comfortable gripping or other touching of the tool holder even though the tool holder may be relatively hot. Similarly, heat flow from the insulating liner 110 into the housing 87 may be lessened by a set of axial, longitudinal ridges, not shown, which extend radially inwardly or grip the liner 110. In addition, as shown in FIG. 22, the insulating liner 110' may be molded to form a set of outwardly extending circumferential ridges 135 which contact the inwardly extending longitudinal ridges at a set of points only, thereby further minimizing the heat conductance between the "blanket" liner 110 and the housing 87.

ELECTRONIC TEMPERATURE CONTROL CIRCUIT

Figure 21:
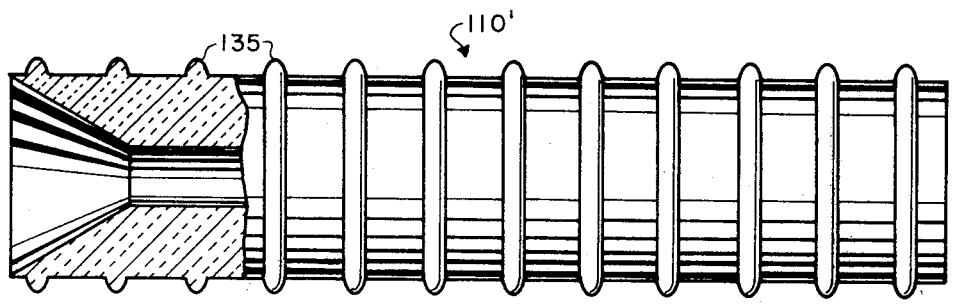
FIG. 21 is a circuit diagram of the electronic control circuit and sensing element including the heater element of the soldering instrument of the present invention.

The electronic control circuit is illustrated in FIG. 21. It will be recalled that FIGS. 4 and 5 show the circuit board 33 with the components thereon. The control circuit of FIG. 22 may be supplied with power by a plug 136 which may supply alternating current to the circuit. The voltage may be either 115 volts or 230 volts. No change or adjustment of the circuit is required when changing the voltage. The lead 137 supplies power to the fuse 44 which has previously been described in connection with FIGS. 10 and 11. Following the fuse 44 there is the resistance wire 26 which forms the heater element as previously explained. A bypass around the resistance wire 26 is formed by a resistor 138 and the lamp 42 which will light up whenever there is a voltage across the resistance wire 26.

The lead 140 connects to the other terminal of the plug 36 and then to a silicon controlled rectifier 141 having a control or gate element 142. The silicon controlled rectifier 141 is connected between the lead 140 and the junction point 143 of the resistance wire 26 and the clamp 42. A diode 144 is also connected to the lead 140 and may be a semiconductor diode. Both the diode 144 and the control rectifier 141 are so poled as to pass only the positive cycles of the alternating point current.

Connected across the silicon controlled rectifier 141 and the diode 144 are two branches of a resistance bridge. The bridge has one branch which consists of resistor 145, potentiometer 146 and resistor 147. The other branch of the resistance bridge includes a resistor 148, resistor 150 and resistor 151 which represents the thermistor 27, that is, the temperature sensing element. The resistor 151 has been shown variable to indicate that its resistance varies as a function of temperature.

The circuit is concluded by a pair of transistors 152 and 153 which may be PNP transistors as shown. Thus the two emitters of transistors 152 and 153 are connected together. A resistor 155 is connected between the junction point of the two emitters and a lead 154 connected between diode 144 and resistors 145 and 148. The base of transistor 153 is connected to the junction point between resistors 148 and 150 while its collector to the junction point 143. The base of transistor 152 is connected to the variable slider 156 of the potentiometer 146. Its collector is tied directly to the control element 142 of the silicon controlled rectifier 141 and also is connected to the junction point 143 through a resistor 157.

Essentially the control circuit of FIG. 22 consists of a resistance bridge. The bridge has four arms, the first being formed by resistor 145 and the portion of resistor 146 above the slider arm 156. The second branch is formed by the lower portion of resistor 146 below the slider 156 and resistor 47. The other two branches are formed by resistor 148 and finally by resistors 150 and 151.

Normally the resistance bridge is balanced but becomes unbalanced due to a change of temperature which varies the resistance of resistor 151. This will now create an error signal which is amplified by the differential amplifier including the two transistors 152 and 153. This error signal in turn will be amplified and will apply such a voltage to the control element 142 as to either turn the silicon controlled rectifier on or off. If the rectifier is on, it will permit the current to pass through the resistance wire 26, but otherwise not.

Since the temperature sensing element 151 is disposed close to the sensing wire 26, the system becomes a closed loop temperature regulating circuit. It is capable of maintaining the temperature of the soldering tip within very close margins. This is due to the fact that the thermistor 151 may be made to be extremely sensitive. For example, the thermistor 151 may have a change of resistance of 1.6% for each change of temperature of 1° F. Thus if the thermistor 151 has a resistance of 1,000 ohms it will change its resistance by 16 ohms per degree Fahrenheit etc.

Assuming, for example, that the temperature of the soldering tip decreases due to excessive radiation of heat or the like, this will cause an increase of the resistance of the thermistor 151. This, of course, will unbalance the bridge. On the other hand, if the temperature of the soldering tip increases beyond the set value, the resistance of the thermistor because below the balance point of the bridge. This will cause the differential amplifier to generate an error signal which in turn off the heater power.

Thus assuming that the soldering tip temperature decreases and that the resistance of thermistor 151 increases; as a result the voltage of the base of transistor 153 becomes more positive with respect to the voltage of the base of transistor 153. Consequently, current flow through the base of transistor 152 and this current isamplfied by the beta of the transistor 152. This amplified currnt now flows through resistor 155 into the emitter of transistor 152 and thence into the collector circuit and back through resistor 157. The current also flows to the gate 142 of silicon controlled rectifier 141. This current flowing through the gate 142 turns on the silicon controlled rectifier 141. Accordingly, current is permitted to flow through the silicon controlled rectifier 142 and to heater element 26. This, of course, will tend to raise the temperature of the soldering tip with a resulting decrease of the resistance of resistor 151.

Assuming now that the resistance of thermistor 151 falls below the balance point due to an increase in temperature. In this case, the voltage applied to the base of transistor 153 becomes more nagative than the voltage at the base of transistor 162. In this case, current flows through the base of transistor 153 which is again amplifier by the beta of transistor 153. The amplified current flows through the resistor 155 into the emitter of transistor 153 and thence through the collector of the transistor. In this case, the base current of transistor 152 does not flow because the two emitters of the two transistors are coupled together. As a result there is no current flowing to the gate 142 and the silicon controlled rectifier 41 is turned off. This will take place during the positive half cycle of the alternating current as soon as anode current stops flowing.

The resistor 157 provides a load for the collector of transistor 152. It also supplies a path for the leakage current of the gate 42. This will prevent misfiring of the silicon controlled rectifier 141.

It should be noted that the diode 144 supplies direct current to the differential amplifier 152, 153 but only during the positive half cycles. As a result, the power dissipation of the various components is only 50% of that when all of the alternating power is applied to the circuit. Accordingly, the silicon controlled rectifier is always turned off during each negative cycle of the input current. Once the rectifier 141 fires, it continues to conduct by self regeneration for the entire positive half cycle. However, it is always turned off when the alternating line voltage becomes negative. Everytime the silicon controlled rectifier fires, the differential amplifier, as well as the bridge supply voltage, are shunted by the rectifier 141. However, this is of no consequence for the operation of the circuit because the rectifier, once fired, continues to conduct during the entire positive half cycle.

As mentioned before, the resistor 138 and neon lamp 42 form the indicator circuit to indicate that power is being supplied to the instrument. It will be understood that the lamp 42 only glows as long as there is a voltage across the resistance wire 26. Hence when the silicon controlled rectifier 141 is turned off, there is no voltage across the heater device wire 26 and hence the lamp 42 is off.

The potentiometer 146 with its slider 156 determines the temperature setting of the instrument. This will be apparent because the position of the slider 156 determine the balance point of the bridge. Thus if the slider 156 is moved upwards, the voltage applied to the base of transistor 152 becomes more positive and vice versa.

It will be understood that the circuit specifications of the electronic temperature control circuit of FIG. 22 may vary according to the design for any particular application. The following circuit specifications are included, by way of example only, as suitable for a soldering instrument using a thermistor with the properties previously explained and for a line voltage range which is broad enough to include 115 or 230 volts of alternating current without the need to switch or otherwise adjust for different line voltage:

| | |
|---|---|
| Resistor 145 | 100,000 ohms |
| Resistor 155 | 100,000 ohms |
| Resistor 148 | 100,000 ohms |
| Resistor 147 | 1,500 ohms |
| Resistor 157 | 1,500 ohms |
| Resistor 150 | 1,000 ohms |
| Resistor 138 | 30,000 ohms |
| Potentiometer 146 | 10,000 ohms |
| Diode 144 | General Electric Type IN5060/A14D |
| Transistors 152 & 153 | Motorola type 2N 5086 |
| Silicon Controlled Rectifier 141 | GE Type C106C2X100 |
| Neon lamp 42 | GE Type AIC |
| Thermistor 151 | Fenwal type GA71C1 10,000,000 ohms |
| Fuse 44 | Beryllium-copper wire .005" diameter |

It is to be emphasized that the same instrument without manual adjustment in any manner may be interchangeably connected to any typical line voltage, the circuit automatically making all adjustments to provide the same desired tip conditions. It may, however, be noted that when a line voltage of 115 volts is utilized, the instrument readily delivers power at the rate of approximately 50 watts; while the same instrument connected to a 230 volt supply delivers up to 200 watts upon instantaneous thermal demand.

ALTERNATIVE EXAMPLE OF HOLDER SYSTEM

Figure 27:
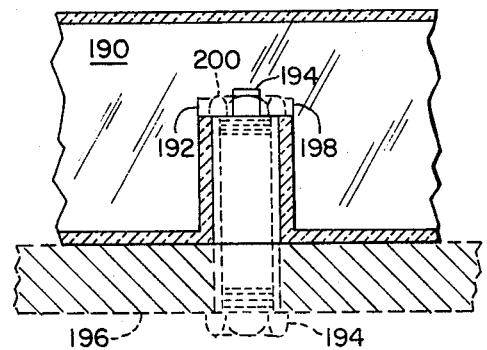
FIG. 27 is a cross sectional view of a portion thereof taken along the reference lines 27—27 of FIG. 24.

Referring to FIGS. 23, 24, 25, and 26, the orthogonal views of an alternative example of a soldering instrument holder 170 illustrate that it includes basically a lower, container base 172 and a cover assembly 174. The base 172 is, in a presently preferred embodiment, molded in one piece in a transparent plastic and forms a forward, heated tip housing portion 176 and a rearward, cleansing fluid reservoir 178 with a partition 180 between them. Also formed in the tip housing portion 176 is a pair of wire solder retaining brackets 182 for holding a spool of solder 184 for dispensing as described below. Along the rear, right edge of the reservoir, a pump housing extension 186 is also molded integrally with the base 172. Contiguously to the extension 186, a fluid level guide 188 is provided to indicate an optimum filling level for the reservoir 176. A similar extension 190 is formed rearwardly in the partition 180 to support a locking bracket 192 for receiving a holddown screw 194 (refer to FIG. 27) which may pass upwardly through a bench top 196 as shown. A set of locking ears 198 are adapted to engage the threaded nut 200 for ease in threading or unthreading the nut and bolt combination 194, 200. Alternatively, for security against theft, the nut may be of the character to lock onto the mounting screw whereby its removal is prevented except by access to the nut by removal of the cover assembly 174 and/or the application thereto of special tools.

Figure 24:
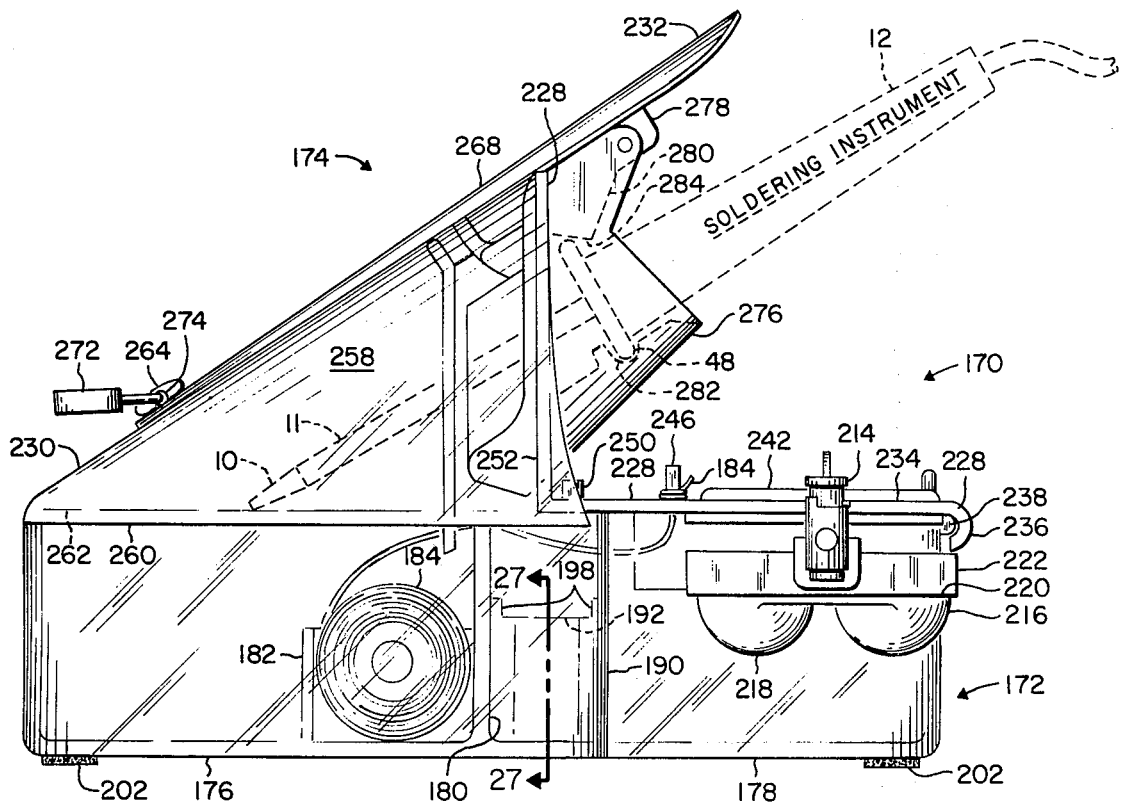
FIG. 24 is a left side elevational view thereof.
Figure 25:
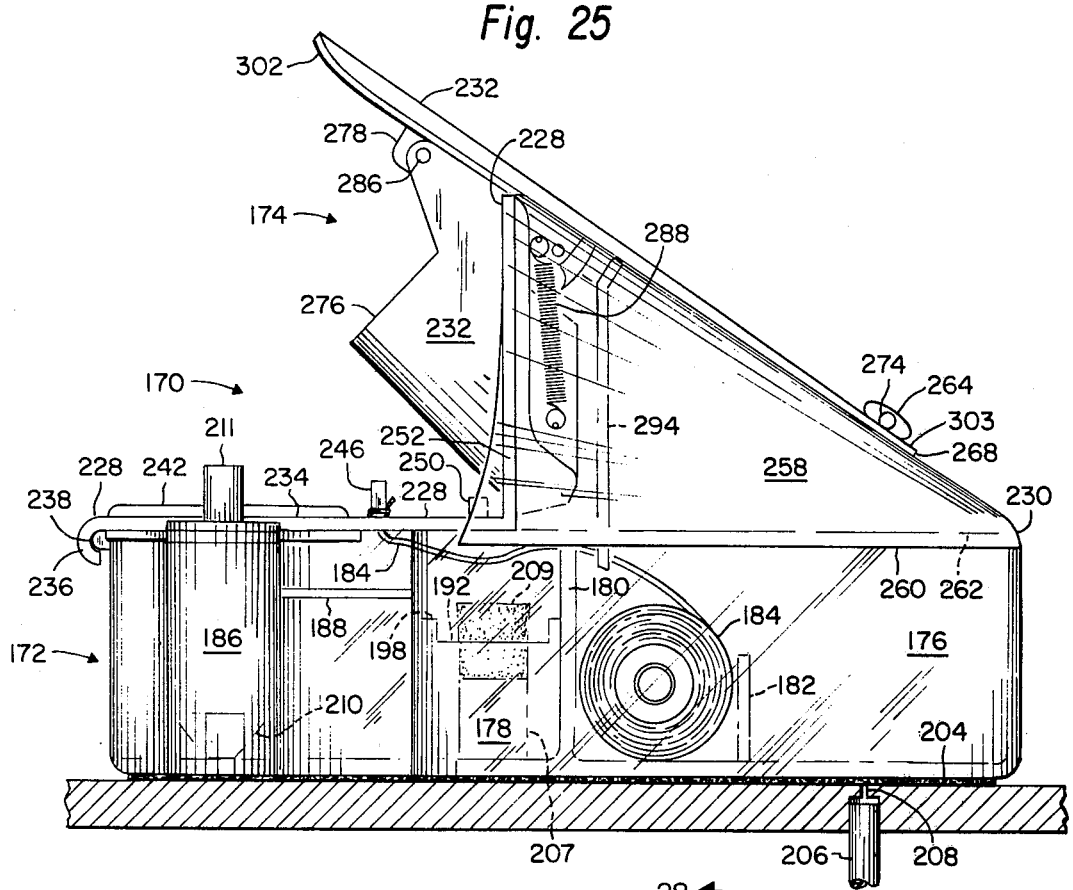
FIG. 25 is a right side elevational view thereof.
Figure 26:
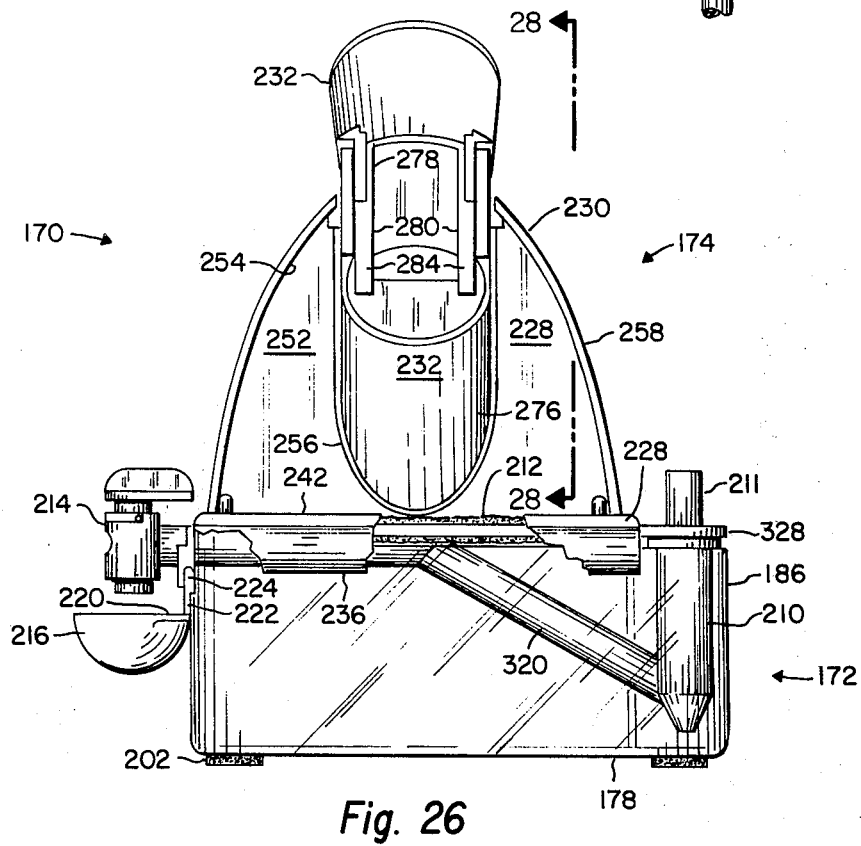
FIG. 26 is a rear elevational view thereof.

In FIG. 24, the base 172 is shown provided with friction feet 202. Alternatively to both the feet 202 and the hold down screw 194, a gasket like seal 204 as shown in FIG. 25 may be provided about the perhiphery of the base 172. The seal may be made of rubber and form an air-tight holding seal between the bench top 196 and the flat, bottom surface of the base 172. The holding seal space may then be evacuated by a vacuum line 206 connected through a hole-down duct 208 to the space bounded by the bottom of the base 172, the top surface of the bench top 196, and the inner periphery of the gasket like seal 204. To complete the seal for the holding seal space, the hole 207 for the hold down screw 194 may be sealed by suitable means such as a rubber stopper 209, for example. A cleansing fluid pump 210, described in detail below, is disposed generally within the reservoir 178 and functions upon operation of its finger plunger 211, to deliver the fluid from the reservoir to a soldering tip cleaning sponge 212 or, selectively by operation of a pump valve 214, to either of a pair of small service bowls 216, 218. When the valve is turned off, the cleanisng fluid is forced by the pump into the sponge 212; when the valve is opened, the fluid is permitted to flow from the valve into one of the service bowls 216, 218. The bowls are molded integrally with a shelf 220 and a mounting bracket 222, the latter being adapted to be horizontally slidably supported in a retaining channel 224 molded in the side of the reservoir 172 along its upper rear edge. The bowls are thusly supported while being free for selective placement under the outlet of the valve 214 as indicated by the dashed lines 226 in FIG. 23. In addition, the bowls assembly may be slidaby totally removed from the retaining channel 224 as for rinsing or cleaning them.

A variety of cleansing solutions for soldering use are known and available. Distilled water alone is advantageous. An antiseptic may be added to prevent unsightly microorganism growth. Ph control towards a weak acid is beneficial in the same respect. Mixtures of alcohols and water are particularly useful for brush cleansing of circuit boards, by brushes dipped in the service bowls 216, 218, to remove soldering flux, varnish residue, or other foreign substances either in preparation for soldering or for cleaning the work subsequently to soldering operations.

The cover assembly 174 comprises three major parts: a rear bracket member 228, a support assembly 232, and a front hood member 230.

The cooperation and interrelation and interlocking connection between these three parts as well as between the base 172 and these three parts is illustrated and described below in connection with the exploded, perspective view of FIG. 30; however, the basic structural aspects of these three parts of the cover assembly may be seen in the orthogonal views of FIGS. 23, 24, 25, 26 as follows.

The rear bracket member 228 comprises a horizontal shelf portion 234 terminating rearwardly in a retaining lip 236 extending laterally across the width of the assembly for interlocking engagement with a retaining ridge 238 molded across the upper rear edge of the reservoir portion of the base 172. The shelf portion 234 of the bracket member 228 then extends forwardly and forms a retaining frame 240 for the periphery of the cleaning sponge 212. A fluid retaining ridge 242 is molded in the shelf portion 234 for retention of any excess fluid forced upwardly into the sponge 212 by the pump 210.

Forwardly of the sponge area of the horizontal shelf portion 234, wire solder dispensing small openings 244 are formed therethrough contiguously to a respective binding post 246 for retaining the end of a length of wire solder from the spool 184. The binding posts are preferably non-round in cross section thereby to grip more securely the wire solder as when it is being pulled to break off a portion for use. Another set of openings 248 are provided through the shelf portion for interlocking alignment to be described below. At the forward edge of the horizontal shelf portion 234 a pair of wedging posts 250, described below, are disposed contiguously to the inner, lower edges of the front hood member 230.

The front portion of the rear bracket member 228 forms a vertical supporting wall 252 which engages, along its upper curved periphery 254, the inner, rear surface of the front hood member 230 and includes a u-shaped cut-out 256 for receiving and retaining the soldering instrument support assembly 232.

The front hood member 230 includes a contoured molded cover portion 258 having a lower peripheral, overhanging retaining lip 260 which interlockingly engages a mating lip element 262 molded about the front and side upper edges of the housing portion 176 of the base 172. A rotating locking key 264 is mounted in the central upper frontal portion of the hood member 230 and protrudes through a mating opening 266 in the front of a latching lever plate 268 of the support assembly 232. When the key 264 is rotated 90° as indicated by the movement arrows 270 in FIG. 23, the edges of the key 264 no longer align with the elongated opening 266 thusly to prevent the inadvertent lifting away of the latching lever plate 268 from the portion of the hood member 230 contiguous to the key 264. In addition, a separately lockable padlock 272 (FIG. 24) may be inserted through the opening 274 in the key 264 thusly to prevent theft of a costly soldering instrument.

The structure of the support assembly 232 part of the cover assembly 174 which both supports and locks the soldering instrument within the holder system includes essentially two portions: a stationery, cradle element 276 which slides interlockingly down into the u-shaped cut-out 256 of the vertical support wall 252 of the rear bracket member 228; and a locking member 278 pivotally supported therefrom. The locking member, in turn, includes the latching lever plate 268 and a cradle locking fork 280. In operation (FIG. 24) it may be seen that the soldering instrument is held by virtue of the enlarged diameter, rim portion 48 of the handle 12 resting within a retaining groove 282 of the cradle element 276 and secured therein by action of the straddling locking fork 280 engaging upper rear edges of the rim portion 48 of the soldering instrument. In this manner it is apparent that the heated soldering tip 10 and its supporting sleeve 11 are securely and protectively held within the forward, tip housing portion 176 of the holder system.

It may also be seen that the soldering instrument is emplaced within the holder simply by inserting the tip and sleeve thereof into the cradle opening generally and then pushing the instrument forwardly until the rim portion 48 has lifted the latching lever plate 268 by its engagement with the lower, sloped ramp surface 284 of the locking fork 280. Once thusly retained, the soldering instrument cannot be removed until the locking fork 280 is lifted away from the rim portion 48 of the soldering instrument. It may also be noted at this point that due to the straddling nature of the locking fork and the large diameter access provided thereby, a soldering instrument having a very large tip width or diameter can be housed within and held by the holder system.

Figure 28:
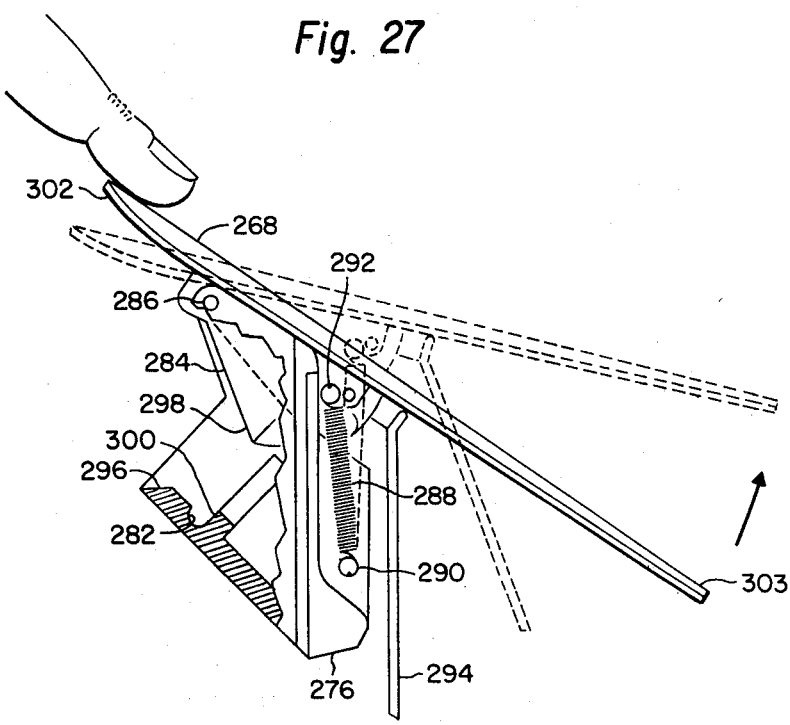
FIG. 28 is a detail view of a portion thereof taken as indicated by the reference lines 28—28 of FIG. 26.

The movement of the latching lever plate may be best understood from a consideration of FIG. 28. The latching lever plate is pivotally supported on the supporting cradle element 276 by a pin 286 and the forward, longer end of the plate is biased downardly by the action of a tension spring 288 connected between a mounting pin 290 on the cradle element 276 and a mounting pin 292 affixed to the plate forwardly of the pivot pin 286. Also affixed to and molded with the lever plate is shown an alignment bracket 294 for assuring an initial approximate alignment of the soldering instrument when its tip and sleeve are inserted into the housing.

Again, it is clear that when the instrument is inserted through the "funneled" or tapered opening 296 of the cradle element 276, the cradle locking fork 280 is pushed upwardly by engagement of its sloped ramp surfaces 284 to permit the retainer rim 48 to drop into the lower, retaining groove 282 and behind the retaining points 298 of the fork 28. The forward, planar face of the handle portion 12 of the soldering instrument is then held at rest against a retaining shoulder 300 of the cradle element 276 for ultimate alignment of the instrument within the holder system. The unlatching operation of the combination is indicated by the operator's finger tip shown pressing downwardly on the rear tip 302 of the latching plate 268. When pressed, as indicated, the forward end 303 of the latching plate rises and the retaining points 298 swing upwardly away from their locking engagement with the rim 48 of the soldering instrument handle 12.

Figure 29:
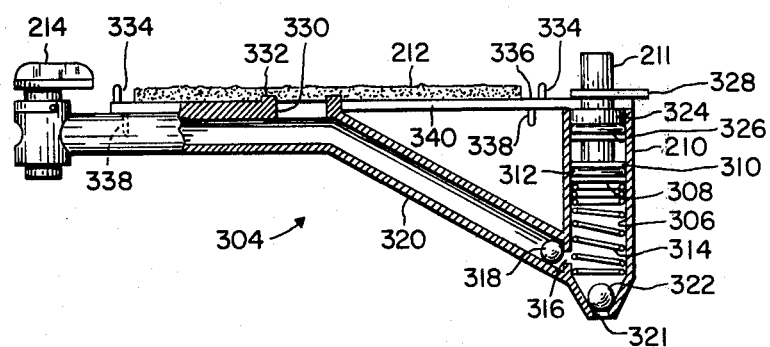
FIG. 29 is a detail and function cross sectional view of the fluid pump portion thereof.

Referring to FIG. 29, the pump assembly 304 is shown separately from the remainder of the holder system. The pump assembly includes the pump 210 having an inner cylindrical bore 306 in which is disposed vertically, axially slidably a piston 308 having an o-ring piston ring 310 carried in an annular retaining groove 312. A rearwardly, upwardly extending actuator plunger 211 is adapted to be pressed by the operator's finger to depress the piston 308 against a stainless steel compression spring 314. Such action forces any fluid in the cylinder below the piston through the opening 316, past the check ball valve 318 and into the supply tube 320. When the piston is released to return upwardly, it draws fluid into the cylinder through the opening 321 past the check ball valve 322. For corrosion protection, the balls as well as the spring 314 should be plastic or stainless metal. The top of the pump cylinder is closed by a removable bushing 324 which may also include an o-ring seal 326 and through which reciprocally passes the plunger 211. A cap plate 328 carried by the bushing 324 covers the actual top end of the pump cylinder. In operation, the cap plate 328 and the plunger 211 may be grasped by the fingers of the operator and lifted up and out of the cylinder to permit access to the reservoir for refilling it; that is, the cleansing fluid is simply poured into the cylinder from whence it drains into the reservoir proper.

The supply tube 320 terminates in the valve 214 and the opening 330 under the cleaning sponge 212. A slight ridge 332 may be provided about the opening 330 to provide better coupling for forcing the fluid directly into the sponge rather than along the bottom surface thereof from whence it may drain back to the reservoir. It is clear that, as described earlier, when the valve 214 is closed, the pumped fluid is forced upwardly into the sponge; when the valve is open, the fluid continues along the supply tube through the valve and into the small service bowls - or other desired receptacle.

In the view of FIG. 29, two sets of assembly alignment pins are shown. A first set of pins 334 extend upwardly from the shelf surface 336 of the pump assembly 304 and engage the alignment holes 248 shown in FIG. 23. A second set of pins 338 downwardly and engage the inner top edge of the walls of the reservoir 172 thusly interlocking all three molded pieces into a laterally stable unit.

The sponge 212 may be secured along its forward and rear edges by being held in laterally extended slots in the shelf portion 336; however, the sponge may be basically held by compression about its periphery between the horizontal shelf portion 234 of the assembly 232 and the shelf portion 336 of the pump assembly. Slots 340 in the latter permit the sponge to drain excess fluid back into the reservoir.

Figure 30:
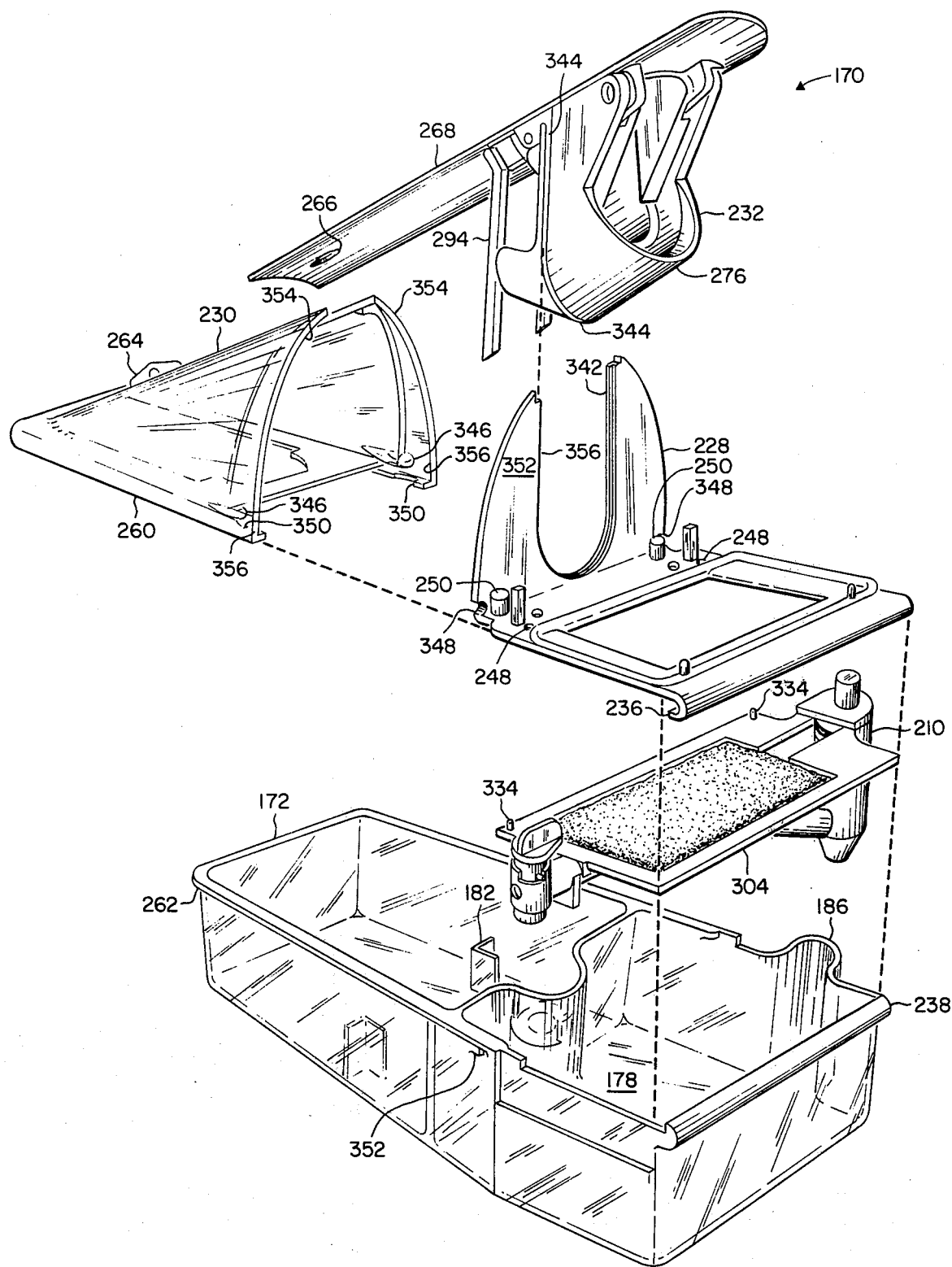
FIG. 30 is an exploded assembly view thereof.

Referring to FIG. 30, the exploded perspective view is presented primarily to clarify the previous orthogonal elevational views and to illustrate the interlocking relation of the assembly components. Accordingly, a reiteration of description of the structural details will not be made.

To assemble the holder 170 system, the container base 172 with its rear retaining ridge 238 and its overhanging retaining lip 260 extending along the forward portions of base 172 may be placed on a work table surface as indicated. The pump assembly 304 is then emplaced over the reservoir 178 with the pump body 210 within the body extension 186 and the lower set of aligning pins 338 within the top lip of the reservoir.

The rear retaining lip 236 of the rear bracket member 228 is then placed over the retaining ridge 238 of the reservoir portion of the base and the forward portion of the bracket member permitted to drop over the pump assembly 304 such that the interlocking, upper alignment pins 334 thereof enter the respective alignment holes 248 in the bracket member.

The support assembly 232 is then lowered into the u-shaped cut-out 256 of the upright portion 252 of the rear bracket member 228. Interlocking between these parts is achieved by virtue of cooperatively mating retaining shoulder 342 about the periphery of the cut-out 256 and shoulder 344 about the similarly curved sides and bottom of the cradle member 276.

To complete the major assembly, the front hood member 230 is disposed with its retaining lips 260 in overhanging engagement with those lips 262 of the base 172 and then forced rearwardly until a set of latches 346 on the inner, lower, rear surface of the hood member snap into locking engagement with a set of mating latch receiving openings 348 formed in the outer lower periphery of the vertical portion 252 of the rear bracket member. Similarly, a second set of locking elements 350, 352 may be provided to lock the total assembly together. It may be noted that the support assembly 232 is interlocked within the rear bracket member 228 by virtue of its capture beneath the upper, inner, rear portions 354 of the front hood member 230.

It should be noted that when the front hood member is being slid rearwardly in this final assembly step, the locking lever plate 268 should be pivoted slightly to provide clearance for the opening 266 in the locking lever plate 268 to receive the rotatable key 264 on the front hood member.

To disassemble the holder system, a screwdriver or similar tool is placed between each of the wedging posts 250 and the lower, rearmost skirt portions 256 of the hood member 230. The skirt portion is pried outwardly to release the latching elements 346, 348, 350, 353 thereby permitting forward sliding motion of the hood member 230 to release, in turn, all other major assembly portions.

Thusly, it may be seen that a soldering instrument holder system, in fact, a complete soldering station, has been disclosed which is essentially totally molded of plastic — most of which may advantageously be transparent. In addition, the assembly whether at the factory or in the user's laboratory may be made, unmade, and remade without special tools and without extrinsic fasteners of any kind. Further, the assembly is readily lockable against inadvertent removal or theft of the soldering instrument from the holder system as well as the holder system from the bench top.

There has thus been disclosed a soldering instrument having a resistive temperature sensor near its tip and an electronic control circuit disposed in the handle of the instrument. The control circuit includes a resistance bridge, one arm of which is formed by the temperature sensing element which may be a thermistor. A differential amplifier generates an amplified error signal in response to unbalance of the bridge. This in turn will either cause power to flow through the heater wire or cause the power to be turned off. The instrument includes a control button by means of which the setting of the temperature may be controlled from the outside. There is further provided a tool holder for the soldering instrument which insulates the instrument and may include a brush liner for cleaning off the soldering tip. The holder will maintain the instrument as its set temperature with a minimum of power. This, of course, will prolong the life of the soldering tip and the heating element because a minimum of power is required and oxidation of the tip is minimized. It is also feasible to calibrate each soldering instrument by inserting it into a tool holder and inserting also therein a temperature measuring instrument.

I claim:
1. Holder apparatus fo an electronically temperature controlled electric soldering instrument of the character including a handle portion having an enlarged diameter retaining shoulder about the periphery of its forward end and a working shaft extending axially forwardly therefrom terminating in a heated tip element, said holder apparatus comprising:
   a housing body having a lower, container portion and a cover portion together defining a substantially closed chamber for containing said shaft and tip element;
   cradle means carried by said cover portion for holding retaining shoulder of said handle portion and supporting said instrument with said shaft and tip element within said substantially closed chamber;
   self locking and unlockable holding means carried by said housing body contiguously to said cradle means for engaging said retaining shoulder and securing said soldering instrument whereby said shaft and tip elements are cantilevered in non contacting relation within said substantially closed chamber;

finger operable trigger means carried by said housing body and connected to said holding means for unlocking it.

2. The invention as set forth in claim 1 in which said lower, container portion of said housing body includes a cleansing liquid reservoir.

3. The invention as set forth in claim 2 which further includes wettable, tip cleaning means carried by said housing body.

4. The invention as set forth in claim 3 which further includes finger operable pump means carried by said housing body in flow communication relation from said reservoir to said wettable, tip cleaning means.

5. The invention as set forth in claim 4 in which said wettable, tip cleaning means includes a sponge affixed to said cover portion of said housing body.

6. The invention as set forth in claim 5 which further includes external, small bowl means carried by said housing body and being selectively in flow communication relation with said pump means for holding small amounts of said cleansing liquid.

7. The invention as set forth in claim 6 which further includes hold-down means for connecting said housing body on external supporting surface.

8. The invention as set forth in claim 1 which further includes wire solder means for holding and dispensing solder and carried by said lower container portion of said housing body.

9. The invention as set forth in claim 1 in which said housing body is at least predominantly mold fabricated of transparent plastic.

* * * * *